United States Patent [19]

Niijima et al.

[11] Patent Number: 5,799,140

[45] Date of Patent: Aug. 25, 1998

[54] DISK ARRAY SYSTEM AND METHOD FOR STORING DATA

[75] Inventors: Hideto Niijima, Tokyo-to; Nobuyuki Matsuo, Kusatsu; Mayumi Shimada, Tokyo-to, all of Japan

[73] Assignee: International Business Machines Corporation, Armonk, N.Y.

[21] Appl. No.: 815,266

[22] Filed: Mar. 10, 1997

Related U.S. Application Data

[62] Division of Ser. No. 426,329, Apr. 21, 1995, Pat. No. 5,650,969.

[51] Int. Cl.$^6$ .................................................... G06F 11/00
[52] U.S. Cl. ............... 395/182.04; 395/180; 395/182.06; 395/182.03; 395/427
[58] Field of Search ........................... 395/182.04, 180, 395/182.06, 182.03, 427; 365/200

[56] References Cited

U.S. PATENT DOCUMENTS

| | | |
|---|---|---|
| 5,124,987 | 6/1992 | Milligan et al. . |
| 5,412,661 | 5/1995 | Hao et al. . |
| 5,416,915 | 5/1995 | Mattson et al. . |
| 5,463,765 | 10/1995 | Kakuta et al. . |
| 5,548,711 | 8/1996 | Brant et al. ............... 395/182.03 |
| 5,632,012 | 5/1997 | Belsan et al. ............... 395/182.04 |
| 5,650,969 | 7/1997 | Niijima et al. . |

FOREIGN PATENT DOCUMENTS

| | | | |
|---|---|---|---|
| 0 522 780 A2 | 7/1992 | European Pat. Off. ........... G06F 3/06 |
| 5-165577 | 7/1993 | Japan ................................. G06F 3/06 |
| 5-224832 | 9/1993 | Japan ................................. G06F 3/06 |
| 5-233155 | 9/1993 | Japan ................................. G06F 3/06 |
| 6-274282 | 9/1994 | Japan . |
| 6-324815 | 11/1994 | Japan . |
| 2 215 156 | 9/1989 | United Kingdom ............ G11C 17/00 |

OTHER PUBLICATIONS

Patterson et al., "A Case for Redundant Arrays of Inexpensive Disks (RAID)", ACM SIGMOD 88, Jun. 1988, pp. 109–116.

Trend, "Technology, and Performance Evaluation of Disk Array Device", Nikkei Electronics, Apr. 26, 1993, pp. 79–103.

R. D. Pashley et al., "Flash Memories: the best of two worlds", IEEE Spectrum, Dec. 1989, pp. 30–33.

Primary Examiner—Viet Q. Nguyen
Attorney, Agent, or Firm—Esther E. Klein

[57] ABSTRACT

A method and system are provided for improving the speed for writing data in a disk array system (RAID). Disks are divided into the ones for reading old data and the other ones for writing new data. An external semiconductor storage device is used as a parity device which significantly enhances performance in writing.

A disk array system is used for storing data for which a parity group comprises N data units stored in sectors of N magnetic disk drives with parity stored in the parity device. At least N+1 data-storing magnetic disk drives are provided, where sectors of at least one magnetic disk drive are used as redundant sectors.

3 Claims, 7 Drawing Sheets

Cluster m:

| Sector 0 | Sector 1 | Sector 2 | Sector 3 |
|---|---|---|---|
| Sector 4 | Sector 5 | Sector 6 | Sector 7 |
| Sector 8 | Sector 9 | Sector 10 | Sector 11 |
| . | . | . | . |
| . | . | . | . |
| . | . | . | . |
| Sector 4k−4 | Sector 4k−3 | Sector 4k−2 | Sector 4k−1 |

Cluster n:

| Sector 0 | Sector 1 | Sector 2 | Sector 3 |
|---|---|---|---|
| Sector 4 | Sector 5 | Sector 6 | Sector 7 |
| Sector 8 | Sector 9 | Sector 10 | Sector 11 |
| . | . | . | . |
| . | . | . | . |
| . | . | . | . |
| Sector 4k−4 | Sector 4k−3 | Sector 4k−2 | Sector 4k−1 |

Cluster buffer

| Sector 0 | Sector 1 | Sector 2 | Sector 3 |
|---|---|---|---|
| Sector 4 | Sector 5 | Sector 6 | Sector 7 |
| Sector 8 | Sector 9 | Sector 10 | Sector 11 |
| . | . | . | . |
| . | . | . | . |
| . | . | . | . |
| Sector 4k−4 | Sector 4k−3 | Sector 4k−2 | Sector 4k−1 |

*FIG. 9*

DISK ARRAY SYSTEM AND METHOD FOR STORING DATA

This application is a division of application Ser. No. 08/426,329 filed on Apr. 21, 1995, now U.S. Pat. No. 5,650,969.

FIELD OF THE INVENTION

This invention relates to a disk array system or redundant array of inexpensive disks (RAID), as an external storage for computers, which uses an external solid state file (SSF) in the form of a block-erase type flash memory (EEPROM), and more particularly, to a disk array system using such a high speed solid state storage device as a parity disk.

Description of the Prior Art

A disk array system, or redundant array of inexpensive disks (RAID) using a number of hard disk drives (HDD) described by D. A. Patterson et al., achieves higher reliability and performance for storing data than a single large HDD. Details of the various levels of this system are provided by D. A. Patterson, G. Gibson, and R. H. Katz, "A Case for Redundant Array of Inexpensive Disks (RAID)", ACM SIGMOD 88, Jun. 1988, pp. 109–116. Recent developments of the disk array system are described, for instance, in an article entitled "Upgraded Disk Array System: the Core of Distributed Systems", Nikkei Electronics, Apr. 26, 1993, pp. 109–116.

The disk array system divides, or stripes, data to interleave the storing of data across a number of magnetic disk drives. In RAID3 data is interleaved on a bit by bit basis and parity is stored in a separate designated redundant disk. In RAID4 data is interleaved by block or sector and parity is stored in a separately designated redundant disk. In RAID5, data is interleaved by sector and the parity values are distribute on a number of HDDs.

FIG. 1 shows the concept of a RAID4 disk array system. In FIG. 1, serial data of a large size is divided into segments the size of a disk sector. Data blocks in sectors, 0, 1, 2, 3, ... are stored on HDD0, HDD1, HDD2, HDD3, ..., with parity values for the data strings positioned corresponding to sectors across HDD0 to HDD3 stored on HDD4, which is a redundancy or parity disk. Even if one HDD fails, this arrangement allows lost data to be rebuilt using the parity and data stored in the other HDDs.

However, as a consequence of parity assignment, a rewrite operation of sector 1, for instance, requires the old data and old parity be read and parity to be rewritten, before the new data is written. Each rewrite operation of data requires reading the old parity from the parity disk before calculating and writing new parity onto the parity disk. For the data disk, it is necessary to read the old data before new data is written. As a whole, the array system has restricted the speed of data writing.

As described above, the data write rate is restricted because dual access operations are required to the same parity disk. One way to relieve this restriction is to use a high speed parity disk. The function of this high speed disk may be carried out by a solid state storage device which uses a block-erasure type of semiconductor flash memory (EEPROM). This semiconductor storage device uses the same instructions and data format as an HDD, and is called a solid state disk device since it appears the same as an HDD when viewed from the CPU. Such semiconductor flash memory is described in "Flash Memories: the best of two worlds", by R. D. Pashley et al, IEEE Spectrum, Dec. 1989, pp. 30–33, and Japanese published patent application 2-10598.

The semiconductor flash memory described above uses blocks as units of erasure and does not allow writing in the same area unless the blocks as units of erasure have been erased. This requires a significant time for writing sectors, because even a change of several bytes in a sector requires temporarily rolling back all the data in the memory block which includes the sector into the memory space of the host computer and erasing the whole memory block before writing back new data into the sector being made empty. Thus, the solid state disk device comprising semiconductor flash memory is very slow in writing, though it is faster in reading, so the overall performance in speed being substantially similar with or lower than the magnetic disk drive.

The same applicant as this application discloses in Japanese published patent application 5-27924, hereby incorporated by reference, a dynamic sector allocation technique which stores data sequentially from the starting point in physical sectors so that new data is always stored in the last sector of the sectors having stored data, for purposes of improving the performance of data write operations and ensuring a uniform number of write and erase operations. To allow for processing commands from the host computer, an external storage device has always made available memory blocks and sectors for writing or copying, and records and maintains the correspondence between the physical addresses of such selected memory blocks and sectors and logical addresses handled by commands from the host computer in an address translation table. The status of memory blocks and sectors are recorded and tracked in respective management tables.

Even in this dynamic sector allocation technique, it is necessary to wait for the completion of writing for each sector before the writing of the next sector for a write request of multiple sectors. This leads to additional processing time for continuously writing sequential data to the solid state disk device, which thus currently cannot be used as a high-speed HDD for RAID. Moreover, it has been another drawback inherent to semiconductor flash memory that the data within the same block into which write operation is being made cannot be read, so some access pattern results in decreased read performance.

SUMMARY OF THE INVENTION

An object of the present invention is to improve the speed of rewrite operations of a disk array system (RAID).

Another object of the present invention is to provide a method for writing data into a storage system using semiconductor flash memory (EEPROM) which is faster than the hard disk drive.

A further object of the present invention is to improve the speed of a disk array system by using a solid state disk device comprising semiconductor flash memory (EEPROM) which employs a high speed writing technique, the solid state disk device is used as a parity disk for storing parity values.

As stated above, restricted write performance in a disk array organization is due to the fact that access should be made twice to each of data and parity disks. In the present invention, disks are divided into the ones for reading old data and the ones for writing new data so as to apparently require only a single access to the data disk, and use an external semiconductor storage device which exhibits significantly enhanced write performance is used for the parity disk to allow for two access operations to be completed within the time frame of a single access to the data disk.

The data disk dividing method described above is achieved in a disk array system which stores a data array, in which data is sequentially divided into N pieces in a unit of sector or sectors to be stored, in respective sectors of N magnetic disk drives, and stores parity in a parity disk, by providing N+1 magnetic disk drives for storing data, storing said data array in N magnetic disk drives, and using the sectors of one disk drive as a redundant sector.

To rewrite any sectors, the sector data including new data is stored on the redundant disk and the sector which has stored old data to be rewritten is taken as a redundant sector.

In particular, the disk array system according to this invention comprises data path control means connected to an interface with the host computer, N+1 magnetic disk drives, and a parity disk. Memory means store an assignment table which records assignments of said sector data to said N+1 magnetic disk drives. Control means read the assignment table from the memory means in response to an instruction from the host computer, and control read operations of the sector having old data to be rewritten and control read operations of the parity, corresponding to said data array to which said data belongs, from said parity disk. Means for XOR'ing new data to be written, said old data, and said parity are used to generate new parity.

The parity disk of the disk array system according to the present invention is configured as a solid state disk device which uses semiconductor flash memory capable of high-speed operation. This solid state disk device is designed to interleave a plurality of parity sectors for write operations and uses a dynamic sector allocation technique which stores data sequentially from the starting point in physical sectors and allows new data to be always stored in the next sector after the last one which has stored data. The solid state disk device also contains a buffer so that physical write operations in the semiconductor flash memory do not disable read operations to permit reading of any sector at any time.

DRAWINGS

BRIEF DESCRIPTION OF THE DRAWINGS

FIG. 9 is an illustration of the relationship between a cluster buffer and two clusters.

DESCRIPTION OF THE PERFERRED EMBODIMENT

Figure 1:
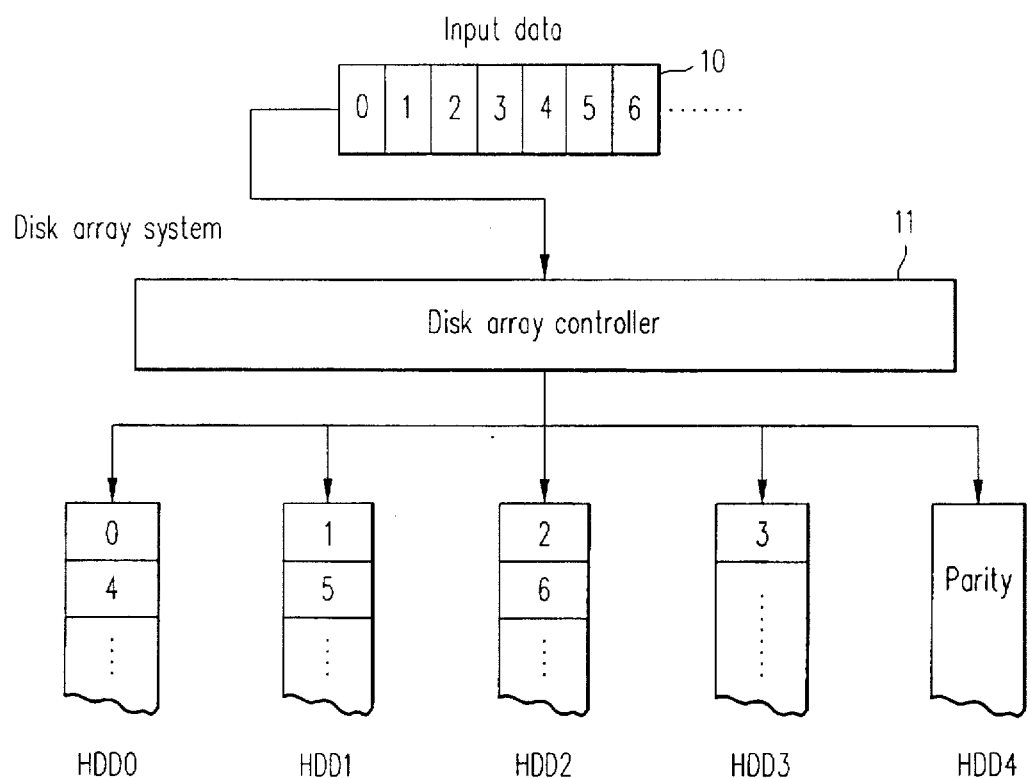
FIG. 1 is a block diagram of a prior art array system.
Figure 2:
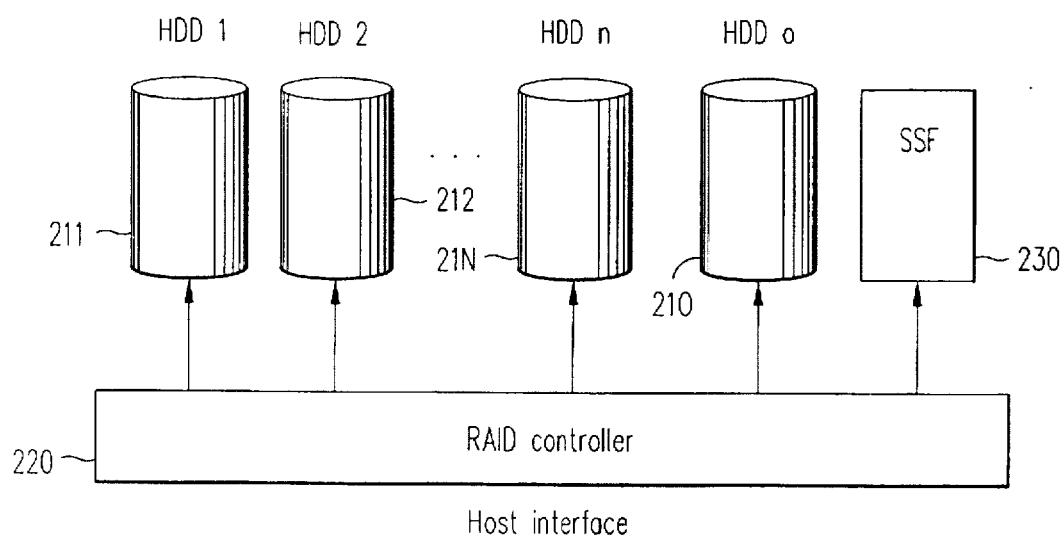
FIG. 2 is a block diagram of an array system in accordance with the present invention.

As shown in FIG. 2, the disk array system comprises N disks 211 to 21N, a redundant disk 210 and a disk 230 which is a solid state disk, also called a solid state file (SSF), formed of high speed semiconductor flash memory. High speed disk 230 contains parity. The redundant disk 210 is not any different from the N main disks. There are N+1 user disks, however, the disk capacity known to the user is N disks. Conceptually there is one redundant disk 210, but this disk 210 is totally equivalent to other data disks 211 to 21N and logically indiscriminable.

The redundant disk does not have to have a separate physical device, but can be spread among all the N+1 data disks.

With a parity group organization similar to RAID4, data is divided into N data elements where a single data element is associated with a single sector on each of N disks. A sector on the N+1 disk is a redundant sector which has no assignment of data element and considered to have stored redundant data (data that has been rewritten). A set of data consisting of contiguous N data elements and their associated parity is called parity group.

A parity group may be formed with input data divided into N data elements in sector sized units. In this case, each disk device contains data in each of a plurality of sectors which is a division unit.

For a data write operation, new update data is written in the redundant sector and simultaneously old data to be overwritten is read from the corresponding sector which has stored this data. At the same time, old parity is read from the appropriate sector of solid state disk device 230 which acts as a parity disk. New parity is generated by exclusive-OR'ing this old parity, the old data being read, and the new data to be written in the redundant sector. This new parity is written back in the same logical sector of solid state disk device 230.

Figure 3:
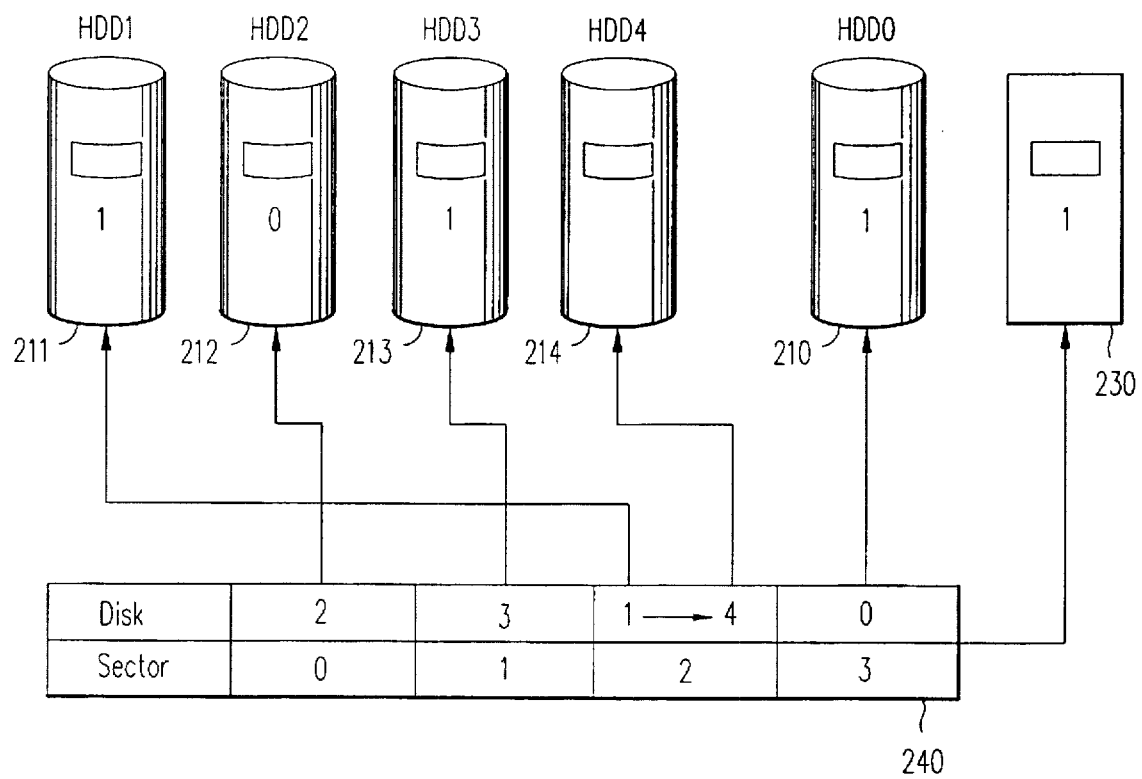
FIG. 3 is a block diagram illustrating the writing of data in accordance with the invention.

Referring now to FIG. 3, a process for the dynamic allocation of sectors is shown using a sector assignment table 240 for a parity group. In accordance with assignment table 240, sector 0 exists on disk 2 and sectors 1, 2, and 3 exist on HDD3, HDD1, and HDD0, respectively. Since HDD4 is not designated by assignment table 240, it can be seen that there is a redundant sector in HDD4. In this embodiment, assignment table 240 is maintained in RAM memory and also written in solid state disk device 230. A solid state disk device having a redundant area in its sector is commercially available. This redundant area may be used to write assignment information therein. In such a case, there would be no overhead due to the writing of assignment information.

In FIG. 3, sector 2 contains data 00101 . . . and this data is to be rewritten with new data 10110 . . . , then the parity corresponding to the data array containing sector 2 should be read from parity disk 230. Assume that this parity is 01001 . . . From the assignment table being read from the solid state disk device during power-on operation and maintained in RAM memory, it can be seen that sector 2 is stored on HDD1. Based on this information, HDD1 is accessed and sector 2 data 00101 . . . is read.

Then, old data 00101 . . . being read, new data 10110 . . . to be written, and old parity 01001 . . . being read are exclusive-OR'ed. The resultant new parity 11010 . . . is written back to solid state disk device 230. Simultaneously, new data is written in the corresponding sector of disk HDD4 which has not stored significant data, and the indication of the disk corresponding to sector 2 in the assignment table is changed from 1 to 4.

As is understood by those skilled in the art, the data units of a parity group need not be stored on identical sectors on the separate storage devices. Since the solid state disk device 230 is four to five times faster than the data disk, the writing of new parity and updated assignment table can be done virtually at the same time as the writing of new data on disk HDD4. In this manner, in accordance with the present invention, the writing of data is done in the redundant sector virtually at the same time as the reading of old data, and since the solid state disk device which acts as a parity disk is capable of reading and writing parity virtually at the same time as data reading and writing, the write speed of the disk array system is improved. Since the table is not updated until the new parity is written there is no problem that there would be inconsistent data.

Figure 4:
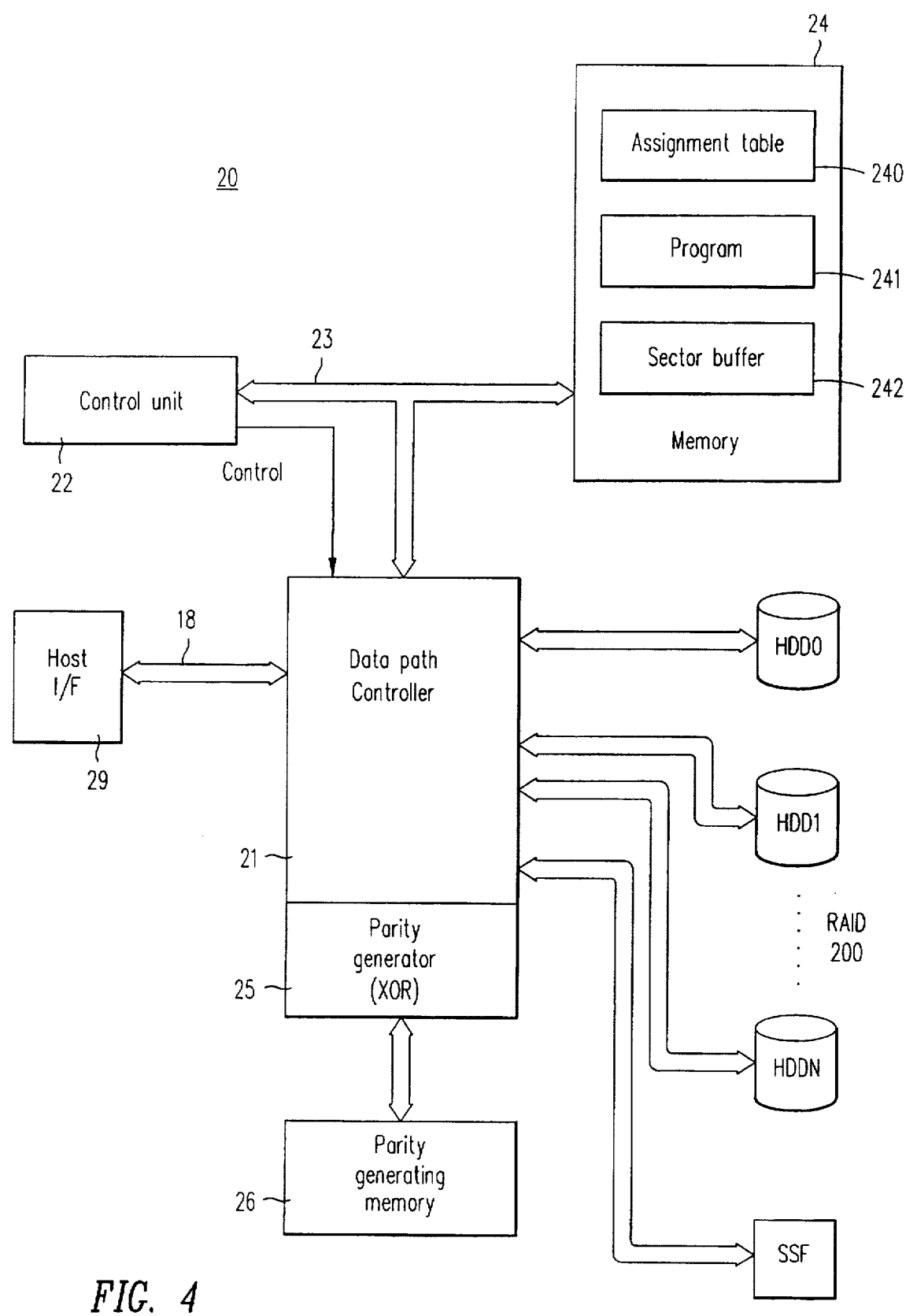
FIG. 4 is a block diagram illustrating the control flow of the array system in accordance with the invention.

FIG. 4 shows a functional organization of the hardware elements of a disk array system 20. Disk array system 20 is provided with data path controller 21 connected to bus 18 via interface 29 with the host computer. Under control of control unit 22, data path controller 21 controls data movement between the interface and RAM memory 24. RAM memory 24 and magnetic disk device 200, and the solid state disk device (SSF) for parity and memory 26 for parity, etc.

Figure 5:
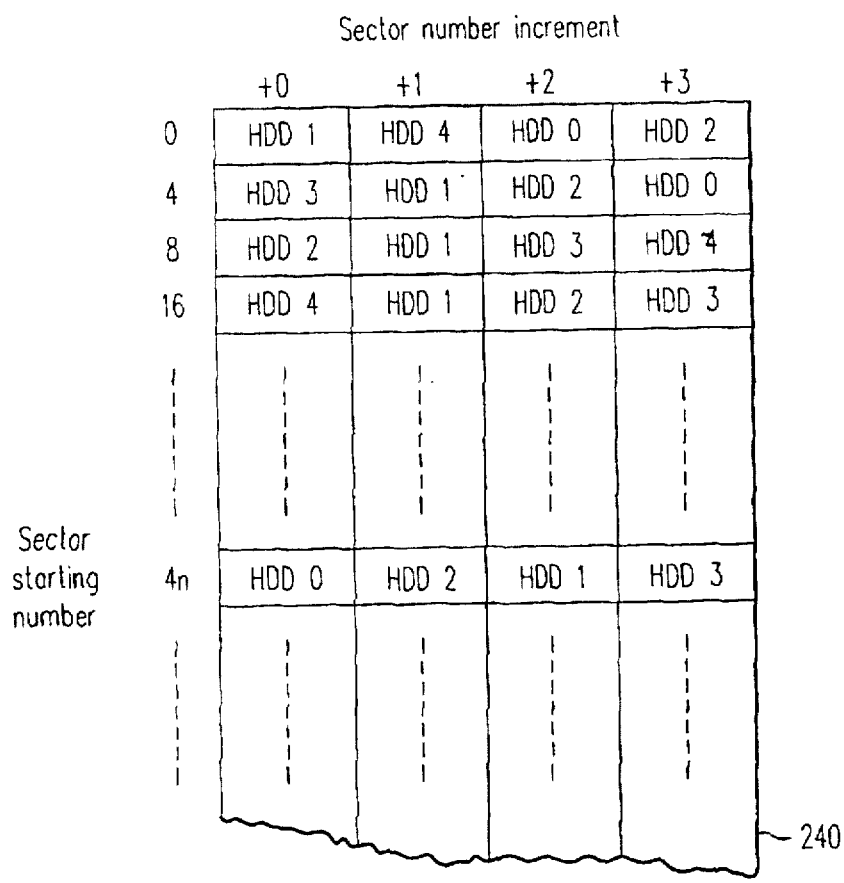
FIG. 5 is a diagram of the general structure of a sector assignment table.

Referring to FIG. 5, a preferred embodiment of the assignment table will now be described. With the reference to a stored array system comprising five hard disk drives, which are numbered from 0 to 4. The assignment table has (5−1)=4 columns. The cell in the n-th row, m-th column indicates on which disk the (4n+m)th sector is stored. It can be seen from FIG. 5 that the sector zero is stored on HDD1 and the sector one is stored on HDD4. Sectors included in each row (from the 4n-th sector to the (4n+3)th sector in the n-th row) are stored in the same physical sectors on each HDD. That is, the sectors included in the n-th row in either n-th physical sector of HDD0 to HDD4 and not stored in any other physical sector. The contents of the assignment table corresponding to the n-th row is maintained in the n-th sector in the SSF. During power-on operation of the system, the assignment table is read from the solid state disk device to build the whole structure of assignment table for use.

When the host computer issues a command to write new data into the 17th sector, for instance, control unit 22 receives this command via data path controller 21 to locate disk device HDD1 wherein sector 17 is stored, using assignment table 240 shown in FIG. 5 which is located in memory 24. The 17th sector is stored in the fourth sector of HDD1 since HDD1 storing the 17th sector of the data array is positioned in the fourth row of the assignment table. Control unit 22 finds out from this assignment table that the redundant sector of the parity group to which the 17th sector belongs is present on disk device HDD0. Control unit 22 instructs HDD1 to read the data stored in the 17th sector and HDD0 to write new data. Next, control unit 22 sends a read request of old parity to the solid state file (SSF). In response to this request, SSF reads the old parity and stores it in parity generating memory 26.

As control unit 22 issues the commands described above to HDD1, HDD0, and the solid state file (SSF), it captures the data to be written from the host computer and stores it in sector buffer 242 of memory 24. Sector buffer 242 has enough capacity for storing data of many sectors, so that it can perform continuous write operations of many sectors.

When HDD1 and HDD0 become ready for processing, the old data, new data in the sector buffer, and old parity in parity generating memory 26 are exclusive-OR'ed while the fourth sector of HDD1 is being read, to generate new parity, which is written back to the solid state file (SSF). Control unit 22 updates assignment table 240 in RAM memory, returns it to memory 24, and also writes the assignment table to SSF.

The parity disk (SSF) will now be described. The present invention employs an external solid state storage or file (SSF) using flash EEPROM for the parity disk of the disk array system. Conventional SSF is several times faster in read operations than the magnetic disk drive and has a substantially similar write rate as the magnetic disk drive. The SSF according to this invention has the enhanced dynamic sector allocation technique as described in Japanese published patent application 5-27924 to achieve a higher speed in reading and writing than the magnetic disk drive.

Preferably the parity disk of the disk array system according to the present invention should have at least four to ten times higher read rates than a magnetic disk drive. Such a disk is available using the sector allocation technique as described in Japanese published patent application 5-27924. While the conventional solid state disk device could be used, it is not preferable for performance. Additionally, there could be other enhanced SSFs that also may be used.

In the preferred embodiment, a logical set is created which consists of a plurality of blocks each of which is independently writable as a physical unit of erasure (block) and is called cluster. As a write sequence within a cluster, it is determined that sectors to be continuously written are assigned along the blocks sequentially. After a write command is issued to a sector of a single block, any write request for the next sector will be received even when the first write operation is not completed, and this second sector is written in the next block within the same cluster. This series of operations will be repeated as long as sector write requests are issued and the block for which the write operation request is made is not busy.

Figure 6:
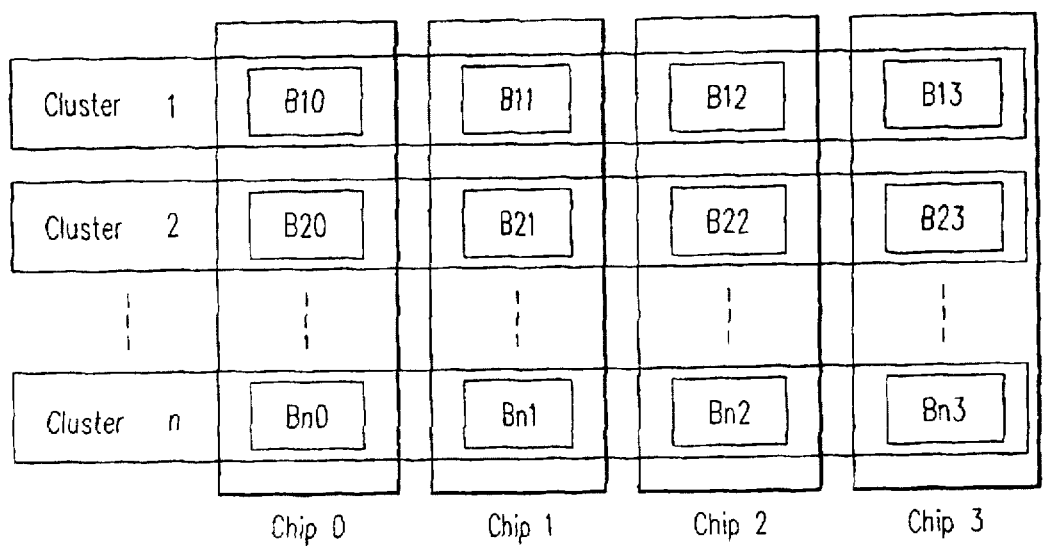
FIG. 6 is an illustration of a cluster organization of a solid state disk device.

In the preferred embodiment, one cluster is taken as containing four blocks, and the blocks included in cluster n are called Bn0, Bn1, Bn2, and Bn3, as shown in FIG. 6. Blocks Bn0, Bn1, Bn2, and Bn3 are included in EEPROM chip 0, chip 1, chip 2, and chip 3, and clusters are configured across these four chips. Respective sectors are taken as parity sectors of the magnetic disk array system (namely RAID). In this embodiment, one block contains k sectors, thus one cluster has 4k sectors. The solid state file (SSF) includes, as a whole, the same number of sectors as the hard disk drive.

The solid state file, SSF, is a hard disk of very high-speed when viewed from control unit 22. Control unit 22 sends the same command as for a conventional HDD to the solid state disk device for read or write operation without knowing what is happening in the solid state disk device.

Figure 7:
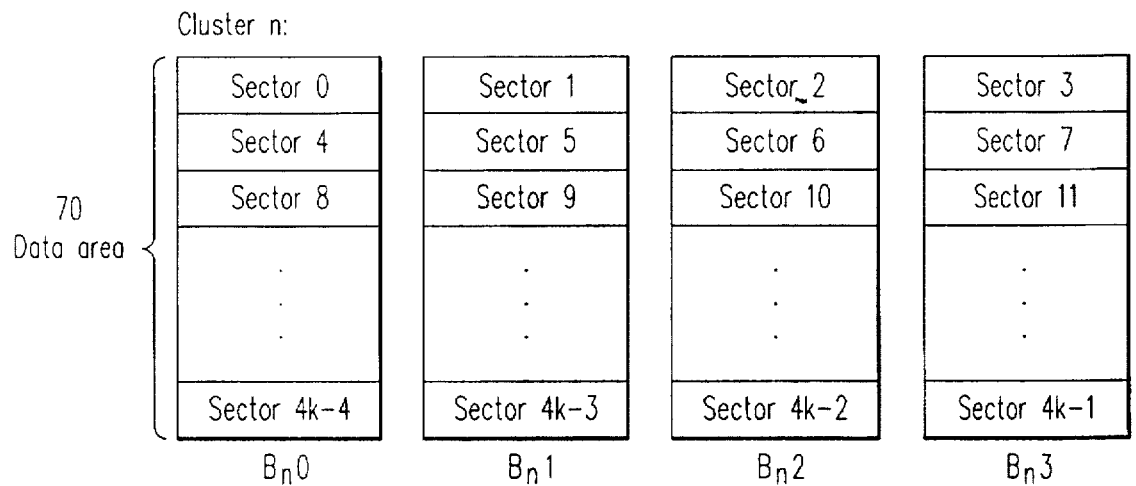
FIG. 7 is an illustration of the organization of a cluster of a solid state disk device.

FIG. 7 shows the sector assignment for blocks Bn0, Bn1, Bn2, and Bn3 that belong to cluster n. One block contains k sectors. Sectors are written in the cluster so that those to be written continuously are assigned along blocks sequentially. Assuming that control unit 22 requests a write operation of five sectors through the I/O bus when nothing is written in cluster n, the first sector data is prepared for being written in Bn0 and afterwards, a write command is executed. Simultaneously, timer T1 is activated which generates an interrupt every tens of microseconds to control the time of writing in Bn0. In the preferred embodiment, four timers are provided responsive to respective blocks.

Usually, a data write operation requires hundreds of microseconds, and it has been necessary to wait for this period of time before starting a write operation for data to be written to the next sector. In accordance with the preffered embodiment of this invention, the next sector data is prepared to be written in block Bn1 during the course of the write operation to block Bn0, and a write command is issued. Similarly, write operations for the third and fourth sector data use blocks Bn2 and Bn3, respectively. In this manner, write operations are performed to four blocks in the same period of time, so the write speed will quadruple.

Referring to FIG. 7, cluster n is empty and the next write pointer (a pointer which indicates the next sector in which data is to be written) of the SSF controller incorporated in the solid state disk device is in the position of sector 0. When control unit 22 sends write requests which involve five sectors, the SSF controller writes the first sector data of the requests in the position of sector 0 and initiates timer T0 for measuring the write time.

The next sector data is written in sector 1 without waiting for the writing in sector 0 to be completed. Then the SSF controller activates timer T1. Similarly, it writes the third sector data in sector 2 and the fourth data in sector 3. In doing so, the controller starts T2 and T3. The last fifth sector data would be written in sector 4, but before writing, T0 is first examined to determine if writing to sector 0 has completed. It waits for the completion of the write before the fifth sector data is written in sector 4 and T0 is initialized again to start. By setting the timer so that after a specified period of time (after the completion of writing, in this example) an interrupt occurs to the SSF controller, the controller can always determine to which block writing has completed.

Figure 8:
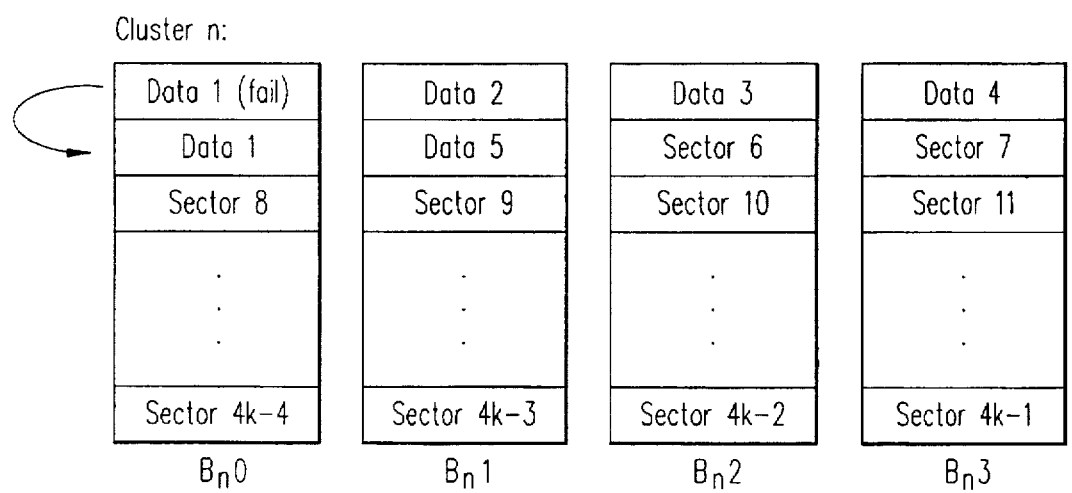
FIG. 8 is an illustration of the writing of data in a cluster.

After write commands have been issued up to block Bn3, the status of block Bn0 is checked, and if the writing of the first sector data is completed, the writing of the fifth sector data being sent from control unit 22 is started. If not, the SSF controller waits for the completion of the writing of the first sector data and writes the fifth sector data. At this time, if the writing in the first sector has failed, the first sector data is written in the next sector of the same block (sector 4 in this example) as shown in FIG. 8, and the fifth sector data is written in the sector of the next block Bn1.

Although the above description assumes that the whole cluster n is empty, the same operation applies even when writing starts from a sector in the middle of a cluster, i.e. the starting point changes, since, in the dynamic sector allocation technique, data is written in sectors of the disk device in a physically sequential order and an empty sector follows the sector in which the last sector data is stored.

The preferred embodiment uses as a cluster buffer a RAM area having the same size and capacity as the cluster. When sector data is written in a sector of any cluster, the writing is also made in the corresponding sector in the cluster buffer simultaneously. Referring now to FIG. 9, assume that the m-th cluster becomes full and the n-th cluster is selected for write operation in a range of the first sector to the fifth sector. Then, a range of area from the first sector to the fifth sector in the cluster buffer retains the same contents as that in the range from the first sector to the fifth sector of the n-th cluster, and an area from the sixth sector to the last sector of the cluster buffer has maintained the contents of the corresponding sectors of the m-th cluster. Since the cluster buffer is maintaining all the data written in the n-th cluster wherein writing may occur and the data has been written but not overwritten in the previous m-th cluster, it is possible to respond to a read command from control unit 22 for the sector data of a block even when the block is being written and not accessible. Note that, however, as writing in the n-th cluster sector proceeds, the sector data of the m-th cluster is replaced with the sector data to be written in the n-th cluster.

Stored in the address translation table used for the dynamic sector allocation technique as described in Japanese published patent application 5-27924, is a pointer which is derived from the logical sector address of the physical address in the semiconductor flash memory EEPROM in which the sector data is actually stored. This embodiment uses this address translation table to manage the data in the cluster buffer. That is, when data is written in the cluster buffer and EEPROM upon a write request from control unit 22, not to EEPROM but the sector address in the cluster buffer is written as a physical address pointer in the address conversion table.

Figure 10:
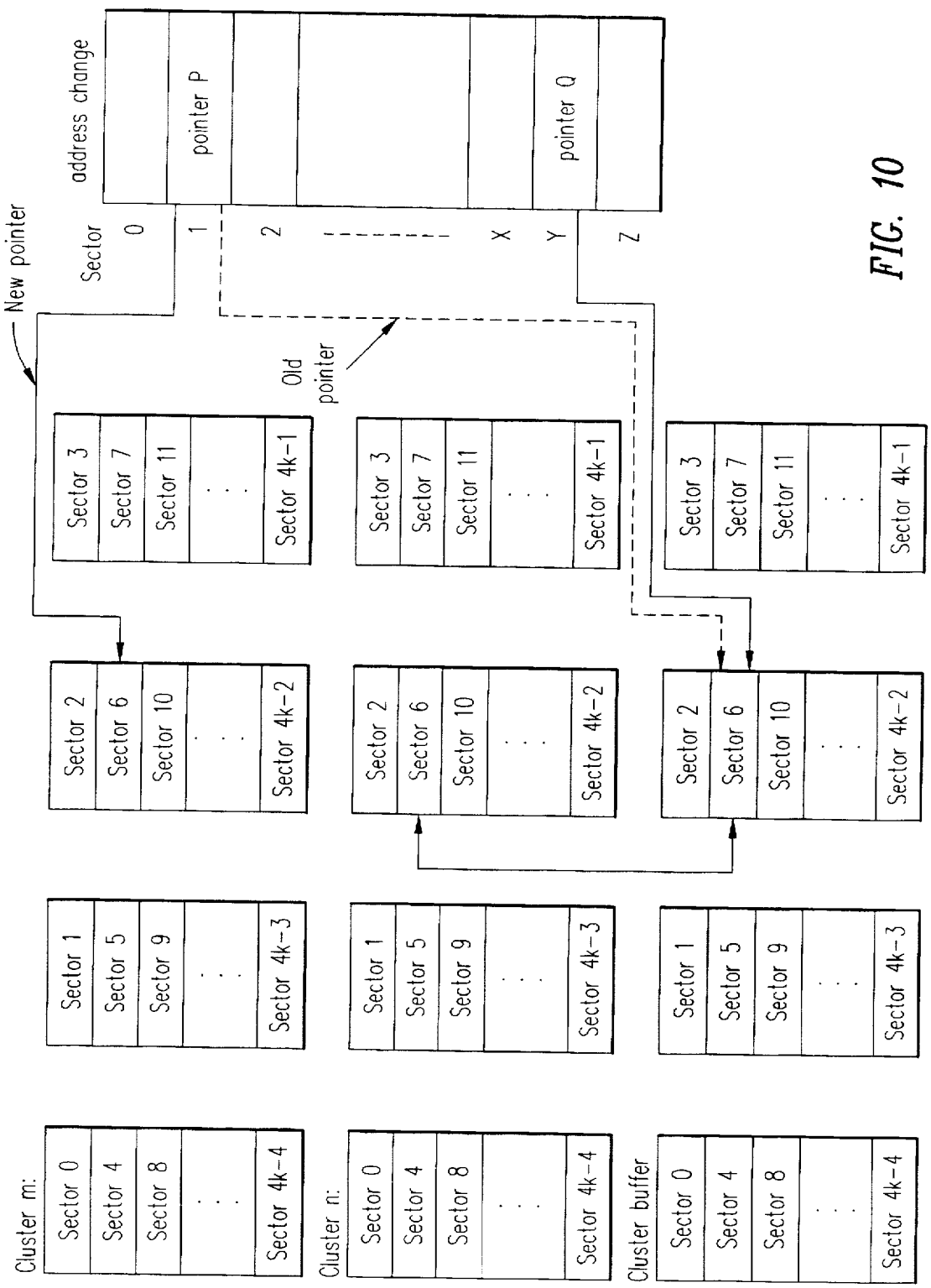
FIG. 10 is an illustration of clusters, cluster buffer and an address conversion table.

Referring to FIG. 10, when the contents of the cluster buffer is overwritten, i.e., in the example shown above, when data is written in the sixth sector of the n-th cluster, pointer P to the sixth sector of the cluster buffer is changed so that it points to the sixth sector of the m-th cluster in EEPROM. Then, pointer Q to the sector data to be written in the sixth sector of the n-th cluster is set to point to the sixth sector of the cluster buffer.

In accordance with this invention, the disk array system is provided with one additional magnetic disk device for storing data, and old data read and new data write operations are done to a separate magnetic disk device for rewriting of data, thereby the speed of the disk array system is improved. Furthermore, the use of solid state disk device comprising high-speed semiconductor flash memory as a disk device for storing parity permits further increase in speed of the disk array system. Since the disk array system according to the present invention employs as a parity disk device an external semiconductor storage device for the interleaved writing of a plurality of data, i.e. solid state file (SSF), the write speed of the disk array system is improved.

Moreover, since construction of the assignment table for data disks is made as part of the writing of parity into SSF, maintaining the assignment table does not incur overhead and an up-to-date assignment table is kept in SSF at all times, thus higher reliability is obtained with the system.

While the invention has been particularly shown and described with reference to the preferred embodiment, it will be understood that various changes of form and detail may be made without departing from the spirit and scope of the invention as defined by the appended claims.

We claim:

1. A solid state disk storage device comprising:
    an external semiconductor storage device which is configured with semiconductor flash memory for which data stored therein can be erased as a block unit consisting of a plurality of sectors, and has independently writable clusters each of which consists of a group of block units;
    a buffer of capacity equivalent to that of said cluster; and
    control means for writing in corresponding sectors in said buffer the same data as is written on said external semiconductor storage device when the data is written on said external semiconductor storage device, wherein said solid state disk storage device, responsive to a read request for sectors which have counterpart sectors in said buffer of said solid state disk storage device, executes read requests from said counterpart sectors in said buffer.

2. The solid state disk storage device according to claim 1 wherein said solid state disk storage device is a parity storing disk storage device for a disk array system.

3. The solid state disk storage device according to claim 2 wherein said solid state disk storage device is a parity storing disk storage device which stores an assignment table for recording assignments of sector data to a magnetic disk drive simultaneously with the writing of parity.

* * * * *